US012725432B2

(12) United States Patent
Kim

(10) Patent No.: US 12,725,432 B2
(45) Date of Patent: Sep. 1, 2026

(54) OBJECT DETECTION DEVICE

(71) Applicants: HYUNDAI MOTOR COMPANY, Seoul (KR); KIA CORPORATION, Seoul (KR)

(72) Inventor: Young Rok Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 90 days.

(21) Appl. No.: 18/660,807

(22) Filed: May 10, 2024

(65) Prior Publication Data

US 2025/0200994 A1 Jun. 19, 2025

(30) Foreign Application Priority Data

Dec. 19, 2023 (KR) ........................ 10-2023-0185950

(51) Int. Cl.
*G06V 20/59* (2022.01)
*G06T 7/70* (2017.01)
*H04N 23/695* (2023.01)

(52) U.S. Cl.
CPC ................ *G06V 20/59* (2022.01); *G06T 7/70* (2017.01); *H04N 23/695* (2023.01); *G06T 2207/20212* (2013.01); *G06T 2207/30196* (2013.01); *G06T 2207/30268* (2013.01)

(58) Field of Classification Search
CPC ..................................................... G06V 20/59
USPC ......................................................... 348/148
See application file for complete search history.

(56) References Cited

U.S. PATENT DOCUMENTS

2008/0095402 A1* 4/2008 Kochi .................... G01C 11/10 382/106
2018/0144204 A1* 5/2018 Miyamoto ........... G06V 20/593

* cited by examiner

*Primary Examiner* — Amir Shahnami
(74) *Attorney, Agent, or Firm* — Lempia Summerfield Katz LLC

(57) ABSTRACT

An object detection device is capable of accurately detecting a position of an object that is a detection target inside a vehicle cabin by using a single image sensor. The object detection device also includes: a sensor part configured to photograph the object existing inside the vehicle cabin; a sensor moving device configured to move a position of the sensor part; and a controller configured to detect the position of the object by combining data on the object photographed before movement of the sensor part and data on the object photographed after the movement of the sensor part.

17 Claims, 21 Drawing Sheets

OBJECT DETECTION DEVICE

CROSS-REFERENCE TO RELATED APPLICATION

This application claims priority to Korean Patent Application No. 10-2023-0185950, filed Dec. 19, 2023, the entire contents of which are incorporated herein for all purposes by this reference.

BACKGROUND

Field

The present disclosure relates to an object detection device capable of accurately detecting an object inside a vehicle cabin.

Description of the Related Art

In a case where three-dimensional (3D) coordinates for detecting targets (i.e., passengers, seat belts, seats, child restraint system (CRS), pets, other objects, and the like) inside a vehicle are required, the 3D coordinates may be easily obtained by using a 3D camera. However, there is a problem that a cost of a device increases due to using the camera.

Accordingly, 3D coordinates may be estimated by using a distance estimation algorithm along with an image captured with a two-dimensional (2D) camera, or 3D coordinates may be obtained by using a 3D sensing method.

However, when using the 2D camera and the distance estimation algorithm method, a challenge arises in accurately determining a size of a detected target (or a detected object) based on a distance between a sensor and the detected target.

In addition, when using the 3D sensing method, a problem arises in that a cost of the device increases due to the specifications of the camera and processor required for image processing.

For example, while a structured light camera may have good accuracy, the camera itself is expensive and an expensive AP (i.e., a processor) is required.

In addition, when a TOF camera having a relatively high-performance AP is required, high material costs are also required.

In addition, while stereo vision has relatively low material costs, the need to process two images simultaneously demands a high-performance expensive processor (AP).

The foregoing is intended merely to aid in the understanding of the background of the present disclosure, and is not intended to mean that the present disclosure falls within the purview of the related art that is already known to those having ordinary skill in the art.

SUMMARY

An objective of the present disclosure is to provide an object detection device capable of accurately detecting a position of an object that is a detection target inside a vehicle cabin by using a single image sensor.

According to a configuration of the present disclosure to achieve the above objective, there is provided an object detection device. The object detection device includes a sensor part configured to generate image data of an object existing inside a vehicle cabin. For example, the sensor part may photograph objects existing inside of the vehicle. The object is referred to as a detection target. The object detection device further includes a sensor moving device configured to move a position of the sensor part. Additionally, the object detection device includes a controller configured to detect a position of the object by combining data on the object photographed before movement of the sensor part and data on the object photographed after the movement of the sensor part.

In one embodiment, the sensor moving device is configured to move the sensor part rectilinearly in a direction perpendicular to a center line of an angle of view relative to the center line of the angle of view at which the sensor part photographs the object.

In another embodiment, the sensor moving device may move the sensor part rectilinearly in an axial direction same as a center line of an angle of view at which the sensor part photographs the object.

The sensor moving device may include: a driving part configured to provide a driving force; a fixed gear mounted on an inner surface of the vehicle cabin and through which the driving force of the driving part is transmitted; and a movable gear provided with the sensor part mounted thereon. The movable gear may be engaged with the fixed gear, and moved rectilinearly together with the sensor part by the driving force transmitted to the fixed gear.

The fixed gear and the movable gear may be a rack gear and a pinion gear.

The sensor moving device may include: a driving part configured to provide a driving force; a guide part fixed to an inner surface of the vehicle cabin and formed in a bar shape; and a slider provided with the sensor part mounted thereon. The slider may be inserted into the guide part, and moved rectilinearly together with the sensor part along a longitudinal direction of the guide part by the driving force transmitted by the driving part.

In the sensor moving device, the sensor part may be configured to move rotationally along a predetermined radius on a plane perpendicular to a center line of an angle of view relative to the center line of the angle of view at which the sensor part photographs the object.

The sensor moving device may include: a driving part configured to provide a driving force; a rotary shaft mounted on an inner surface of the vehicle cabin; and a rotary part provided with the sensor part mounted on an end thereof. The rotary part may be coupled to the rotary shaft, and moved rotationally around the rotary shaft together with the sensor part by the driving force transmitted to the rotary shaft.

The object detection device may further include: a reflection part provided to reflect a shape of the object and allow the reflected shape of the object to be positioned within a range of an angle of view at which the sensor part photographs the object. The controller may configured to detect the position of the object by combining the data of the object photographed by the sensor part and data of the object reflected by the reflection part and photographed by the sensor part.

The object detection device may further include: a reflection part moving device configured to move a position of the reflection part. The controller may detect the position of the object by combining data of the object photographed before movement of the reflection part and data of the object photographed after the movement of the reflection part.

In one embodiment, the reflection part moving device is configured to move the reflection part rectilinearly in a direction parallel to a reflective surface of the reflection part.

In another embodiment, the reflection part moving device is configured to move the reflection part rectilinearly in a direction in which the reflective surface of the reflection part moves away from or to the sensor part.

The reflection part moving device may include: a driving part configured to provide a driving force; a fixed gear mounted on an inner surface of the vehicle cabin and through which the driving force of the driving part is transmitted; and a movable gear provided with the reflection part mounted thereon. The moveable gear may be engaged with the fixed gear, and moved rectilinearly together with the reflection part by the driving force transmitted to the fixed gear.

The fixed gear and the movable gear may be a rack gear and a pinion gear.

The reflection part moving device may include: a driving part configured to provide a driving force; a guide part fixed to an inner surface of the vehicle cabin and formed in a bar shape; and a slider provided with the reflection part mounted thereon. The slider may be inserted into the guide part, and moved rectilinearly together with the reflection part along a longitudinal direction of the guide part by the driving force transmitted by the driving part.

In one embodiment, the reflection part moving device may rotate a second end of the reflection part around a first end of the reflection part.

The reflection part moving device may include: a driving part configured to provide a driving force; a rotary shaft mounted on an inner surface of the vehicle cabin and through which the driving force of the driving part is transmitted; and the reflection part having a first end thereof coupled to the rotary shaft and having a second end thereof moved rotationally around the rotary shaft by the driving force transmitted to the rotary shaft.

The controller may be configured to detect the position of the object by securing 3D coordinates of the object based on the object data secured through the sensor part.

Through the above-described technical solution, the present disclosure has an effect that a position of an object is detected by using a single image sensor. As a result, a decrease in the number of sensor parts is achieved, and a cost of the device is reduced. Additionally, a configuration with an algorithm that does not require processing two or more images simultaneously so as not to require building high-performance hardware is achieved. As a result, the cost incurred to build the device is substantially reduced.

Moreover, the present disclosure has an effect that driver monitoring and occupant detection system (ODS) functions (related to passenger detection, CRS, and airbags) may be replaced and passenger's body key points for detecting incorrect seat belt use may be more accurately measured.

BRIEF DESCRIPTION OF THE DRAWINGS

These drawings are for reference only in describing embodiments of the present disclosure. Therefore, the technical idea of the present disclosure should not be limited to the accompanying drawings.

DETAILED DESCRIPTION

Figure 1:
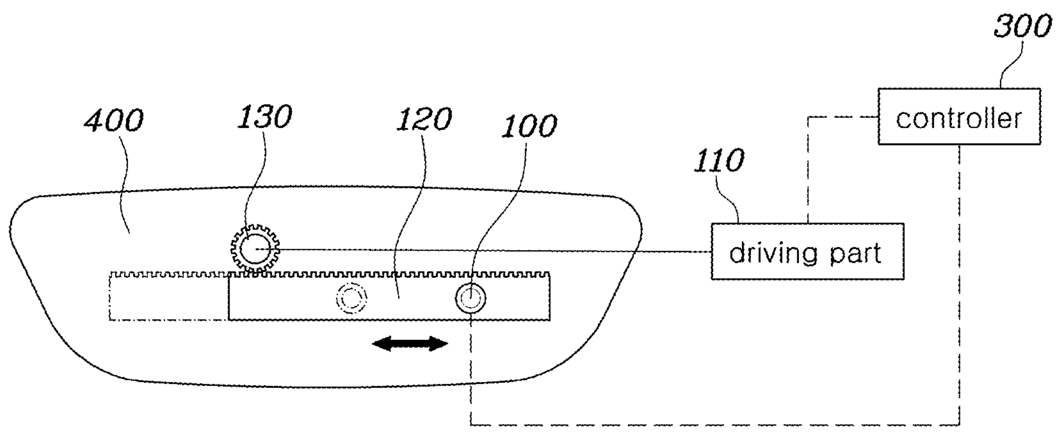
FIG. 1 is a view illustrating a configuration of a first embodiment in which a sensor part moves rectilinearly according to the present disclosure.

Hereinafter, the embodiments disclosed in the present disclosure are described in detail with reference to the accompanying drawings, but regardless of the reference numerals, the same or similar components are given the same reference numbers, and the overlapping description thereof have been omitted.

The suffixes such as "module" and "unit/part" used in the following descriptions are given or mixed in consideration to ease understanding of the description, and the suffixes do not have distinct meanings or roles by themselves.

In describing the embodiments disclosed in the present disclosure, when it is determined that a detailed description of a related known technology may obscure the subject matter of the embodiments disclosed in the present disclosure, the detailed description thereof is omitted. In addition, the accompanying drawings are only to easy understanding of the embodiments disclosed in the present disclosure. Furthermore, the technical idea disclosed in the present disclosure is not limited by the accompanying drawings, and it should be understood that the accompanying drawings include all changes, equivalents, or substitutes, which are included in the spirit and technical scope of the present disclosure.

It should be understood that, although the terms including ordinal numbers, such as first, second, and the like may be used herein to describe various elements, these elements should not be limited by these terms. These terms are only used for the purpose of distinguishing one component from another component.

It should be understood that when a component is referred to as being "coupled" or "connected" to another component, it may be directly coupled or connected to the other component or intervening components may be present. In contrast, when a component is described as being "directly connected," "directly coupled," or "directly linked" to another component, it should be understood that there are no intervening components present therebetween.

As used herein, the singular forms are intended to include the plural forms as well, unless the context clearly indicates otherwise.

It should be further understood that the terms "comprise," "include," "have," and the like when used in the present specification, specify the presence of stated features, integers, steps, operations, elements, components, and/or combinations of them but do not preclude the presence or addition of one or more other features, integers, steps, operations, elements, components, and/or combinations thereof.

In addition, a controller may include: a communication device for communicating with other controllers or sensors in order to control functions in charge; a memory for storing an operating system, logic instructions, and input/output information; and one or more processors for performing determinations, calculations, and decisions, which are required for controlling the functions in charge.

When a component, device, element, or the like of the present disclosure is described as having a purpose or performing an operation, function, or the like, the component, device, or element should be considered herein as being "configured to" meet that purpose or to perform that operation or function.

The embodiments of the present disclosure are described in detail with the accompanying drawings as follows.

An object detection device according to the present disclosure is configured to include: a sensor part 100 for photographing an object that is a detection target existing inside a vehicle cabin; a sensor moving device 40 for moving a position of the sensor part 100; and a controller 300 for detecting a position of the object by combining data of the object photographed before movement of the sensor part 100 and data of the object photographed after the movement of the sensor part 100.

Referring to FIG. 1, the sensor part 100 is a vision sensor for photographing an object. The sensor part 100 may be a 2D camera for detecting infrared rays (IRs) and RGB (colors) and may also be a 2D camera for detecting infrared rays (IRs) only.

As such, the sensor part 100 is installed inside a vehicle cabin and performs detection by photographing objects (i.e., passengers, seat belts, seats, child restraint systems (CRS), companion animals, other objects, and the like) existing inside the vehicle cabin.

The sensor part 100 may be installed while configured as only one, but two or more sensor parts may be installed in positions available for photographing an object.

The sensor part 100 may be installed on a rearview mirror 400, and may be installed on an overhead console, a rear seat room lamp, a rear seat headlining, and the like.

The sensor moving device serves to change a position of the sensor part 100 by moving the sensor part 100 in a rectilinear direction or in a rotational direction. In this case, the sensor part 100 may be moved within a range available for photographing a corresponding object within an angle of view at which the photographing is performed by the sensor part 100.

The controller 300 serves to process data of images captured through the sensor part 100, and stores and processes the image data of an object photographed before movement of the sensor part 100 and the image data of the object photographed after the movement of the sensor part 100.

Specifically, the controller 300 may detect a position of an object by securing 3D coordinates of the object based on the object data secured through the sensor part 100.

Figure 17:
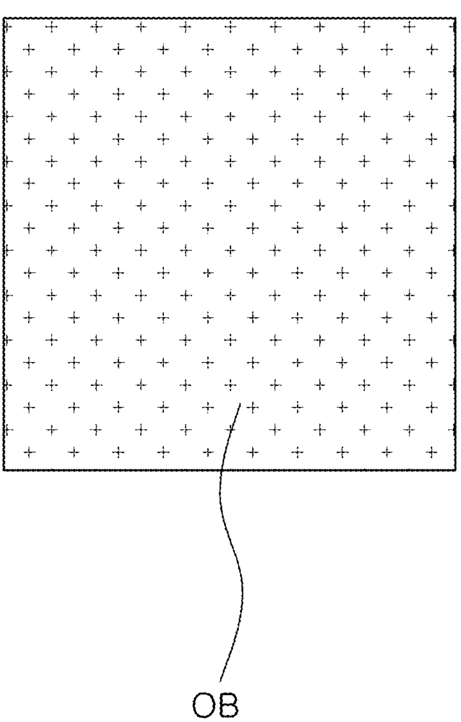
FIGS. 17 and 18 are views illustrating images taken of an object before and after movement of a sensor part according to the present disclosure.
Figure 18:
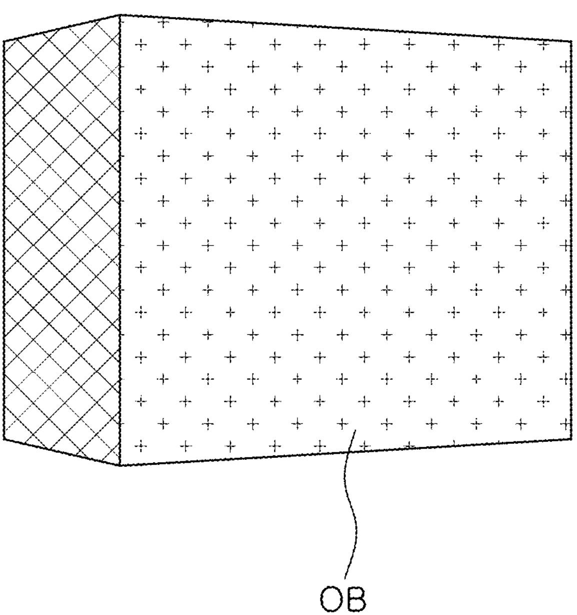

In other words, as shown in FIGS. 17 and 18, the sensor part 100 calculates an angle and a distance between the sensor part 100 (i.e., a reference point) and the object by using two or more pieces of image data including both an image OB of the object photographed before movement and an image OB1 of the object photographed after the movement. Additionally, the sensor part 100 accurately detects a 3D coordinate position of the object based on a calculated result.

Accordingly, when detecting a passenger as an object, a body key point algorithm capable of detecting the body of the passenger and tracking a key point for each body part of the passenger may be implemented. Additionally, physical features (i.e., a height, an age, and the like) of the passenger may be detected by using the secured 3D coordinates.

In addition, by securing 3D coordinates of objects such as seats/CRS/things, not only their positions may be accurately detected but also the corresponding objects may be distinguished from each other and detected.

Accordingly, a single vision sensor is used to detect a position of an object so that the number of sensor parts 100 is decreased, thereby reducing a device cost. In addition, a configuration is realized with an algorithm that does not require processing two or more images simultaneously, so that building high-performance hardware is not required. As a result of the configuration, the cost incurred to build the device is reduced.

In addition, driver monitoring and occupant detection system (ODS) functions (related to passenger detection, CRS, and airbags) may be replaced and passenger's body key points for detecting incorrect seat belt use may be more accurately measured.

In addition, the sensor moving device may move the sensor part 100 rectilinearly in a direction perpendicular to a center line of an angle of view relative to the center line of the angle of view at which the sensor part 100 photographs the object.

For example, in a case where an angle of view of the sensor part 100 is 120°, a virtual center line at the center of 120° becomes the center line of the angle of view.

Figure 2:
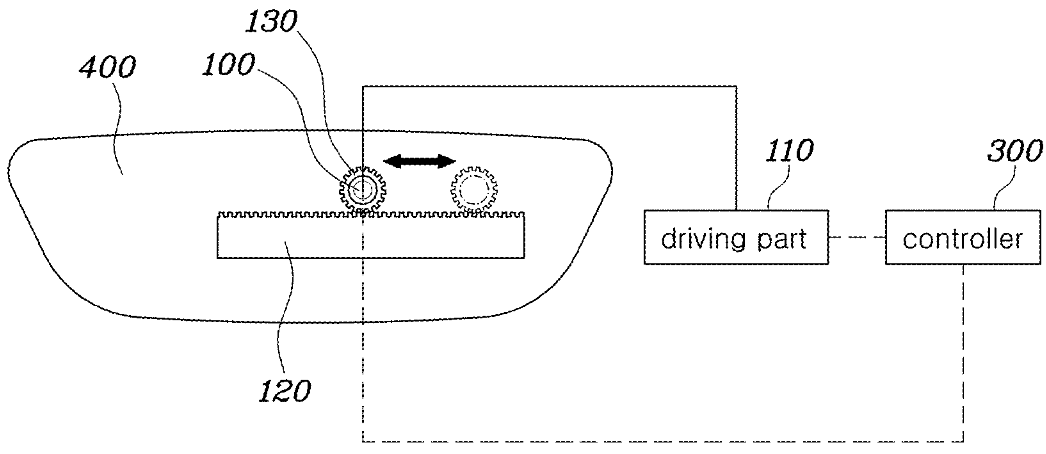
FIG. 2 is a view illustrating a configuration of a second embodiment in which a sensor part moves rectilinearly according to the present disclosure.
Figure 3:
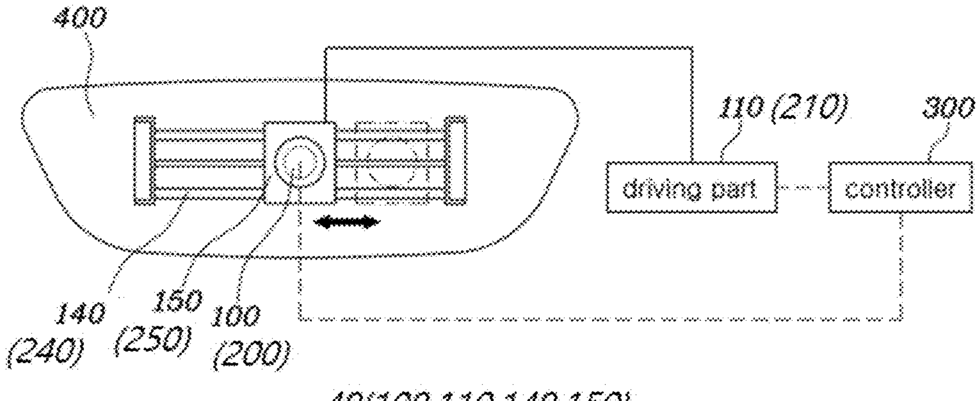
FIG. 3 is a view illustrating a configuration of a third embodiment in which a sensor part moves rectilinearly according to the present disclosure.

Accordingly, as shown in FIGS. 1-3, in a case where the sensor part 100 is installed in the rearview mirror 400, the center line of the angle of view of the sensor part 100 is directed toward an interior direction perpendicular to a plane of the rearview mirror 400.

Accordingly, as the sensor part 100 moves left and right or moves forward and backward on a plane of the rearview mirror 400, a position of the sensor part 100 is moved. As a result, images that would have been captured by two or more sensor parts 100 may be secured through one sensor part 100.

In addition, the sensor moving device may move the sensor part 100 rectilinearly in an axial direction same as the center line of the angle of view at which the sensor part 100 photographs the objects.

Figure 4:
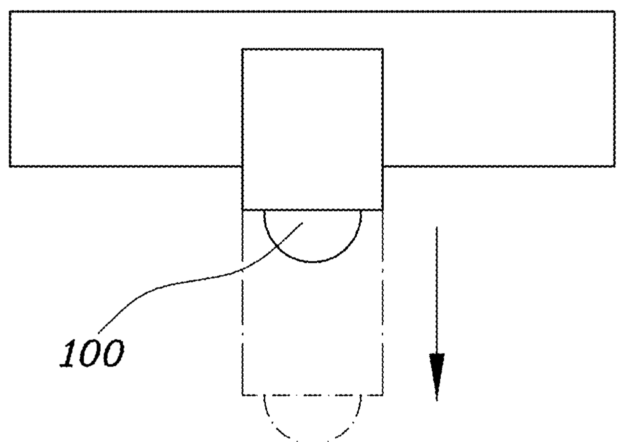
FIG. 4 is a view illustrating a configuration of a fourth embodiment in which a sensor part moves rectilinearly according to the present disclosure.

In other words, in the case where the sensor part 100 is installed in the rearview mirror 400, as shown in FIG. 4, the center line of the angle of view of the sensor part 100 is directed toward the interior direction perpendicular to the plane of the rearview mirror 400.

Accordingly, as the sensor part 100 is pulled out or pulled in and moved on the plane of the rearview mirror 400 toward the interior direction perpendicular to the plane of the rearview mirror 400, the position of the sensor part 100 is moved. As a result, images that would have been captured by two or more sensor parts 100 may be secured through one sensor part 100.

As shown in FIGS. 1 and 2, the sensor part 100 may be configured to move rectilinearly through a sensor moving device having a gear meshing method.

Specifically, the sensor moving device includes: a driving part 110 for providing a driving force; a fixed gear mounted on an inner surface of a vehicle cabin and through which the driving force of the driving part 110 is transmitted; and a movable gear provided with the sensor part 100 mounted thereon. The moveable gear is engaged with the fixed gear and moved rectilinearly together with the sensor part 100 by the driving force transmitted to the fixed gear.

The fixed gear and the movable gear may be a rack gear 120 and a pinion gear 130. The fixed gear may be the rack gear 120 or the pinion gear 130, and the movable gear may be the rack gear 120 or the pinion gear 130, so that the sensor part 100 may be mounted on the rack gear 120 or the pinion gear 130 depending on embodiments.

FIG. 1 illustrates a configuration in which a sensor part 100 is mounted on a rack gear 120. When described with reference to the drawing, the rack gear 120 is installed in left and right directions on a rearview mirror 400, a pinion gear 130 is engaged with the rack gear 120, and a driving part 110 is connected to the pinion gear 130.

The driving part 110 may be a rotary motor capable of driving the pinion gear 130 to rotate, and the pinion gear 130 rotates around an axis thereof by a rotational driving force provided by the driving part 110.

In addition, as the rack gear 120 is engaged with the pinion gear 130, the rack gear 120 moves left and right rectilinearly by the rotation of the pinion gear 130.

In particular, as the sensor part 100 including a lens is coupled to the rack gear 120, the sensor part 100 moves left and right rectilinearly along with the movement of the rack gear 120, whereby a position of the sensor part 100 becomes changeable.

FIG. 2 illustrates a configuration in which a sensor part 100 is mounted on a pinion gear 130. Referencing the drawings, a rack gear 120 is installed in left and right directions on a rearview mirror 400, the pinion gear 130 is engaged with the rack gear 120, and a driving part 110 is connected to the pinion gear 130.

The driving part 110 may be a linear motor capable of driving the pinion gear 130 to move left and right rectilinearly. In other words, the pinion gear 130 is moved left and right rectilinearly by a driving force provided by the driving part 110.

In this case, as the pinion gear 130 is engaged with the rack gear 120, the pinion gear 130 moves left and right rectilinearly along a longitudinal direction of the rack gear 120.

In particular, as the sensor part 100 including a lens is coupled to the pinion gear 130, the sensor part 100 moves left and right rectilinearly along with the straight line movement of the pinion gear 130. As a result, a position of the sensor part 100 becomes changeable.

In such a configuration, the sensor part 100 may be coupled to the center of the pinion gear 130. The sensor part 100 may be coupled to the pinion gear 130 through a bearing, and the like, so that the sensor part 100 is prevented from rotating together with the pinion gear 130.

In addition, as shown in FIG. 3, a sensor part 100 may be configured to be movable rectilinearly through a sensor moving device having a sliding movement structure.

Specifically, the sensor moving device includes: a driving part 110 for providing a driving force; a guide part 140 fixed in a bar shape to an inner surface of a vehicle cabin; and a slider 150 provided with the sensor part 100 mounted thereon. The slider 150 is inserted into the guide part 140, and is moved rectilinearly together with the sensor part 100 along a longitudinal direction of the guide part 140 by the driving force transmitted by the driving part 110.

Referring to FIG. 3, the guide part 140 having top and bottom portions thereof at which a plurality of bars is installed to be spaced apart from each other is installed in left and right directions on the rearview mirror 400 of the vehicle cabin. Additionally, in a state of being inserted into the guide part 140, the slider 150 may be moved left and right along the guide part 140.

The driving part 110 may be a linear motor capable of moving the slider 150 left or right rectilinearly. The slider 150 moves left and right along the guide part 140 by the driving force provided by the driving part 110.

In particular, as the sensor part 100 including a lens is coupled to the slider 150, the sensor part 100 moves left and right rectilinearly along with the movement of the slider 150. As a result, a position of the sensor part 100 becomes changeable.

According to such a configuration, coordinates of an object are calculated in a method of comparing frames taken before and after the movement of the sensor part 100 with each other. As a result, this method may be valuably used in passenger detection where a speed of processing coordinate calculation is not required to be high, 3D coordinate processing to detect passenger size is desired, and the like.

Furthermore, by disposing only one sensor part 100 in a limited layout, the configuration presents an advantageous layout compared to a structure in which multiple sensor parts 100 are arranged.

In one embodiment, the sensor moving device may rotationally move the sensor part 100 along a predetermined radius on a plane perpendicular to a center line of an angle of view relative to the center line of the angle of view at which the sensor part 100 photographs an object.

Figure 5:
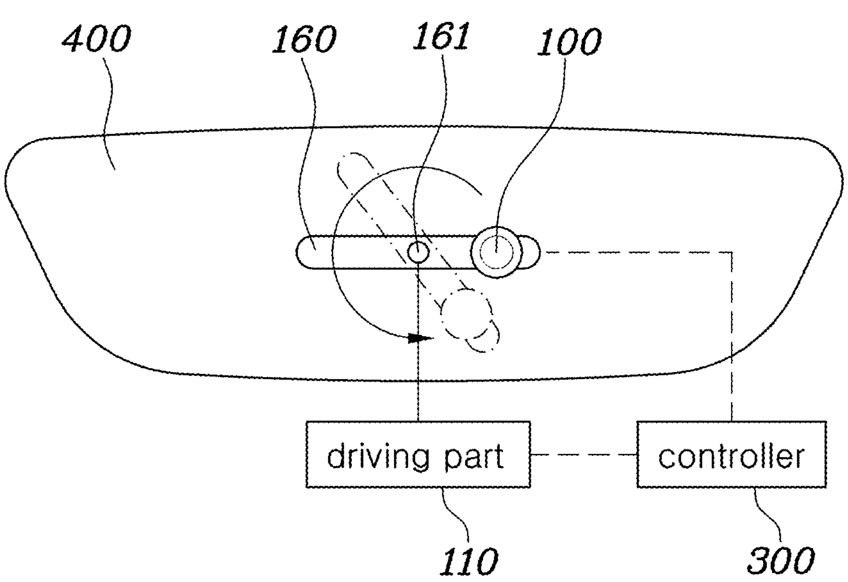
FIG. 5 is a view illustrating a configuration of a first embodiment in which a sensor part moves rotationally according to the present disclosure.
Figure 6:
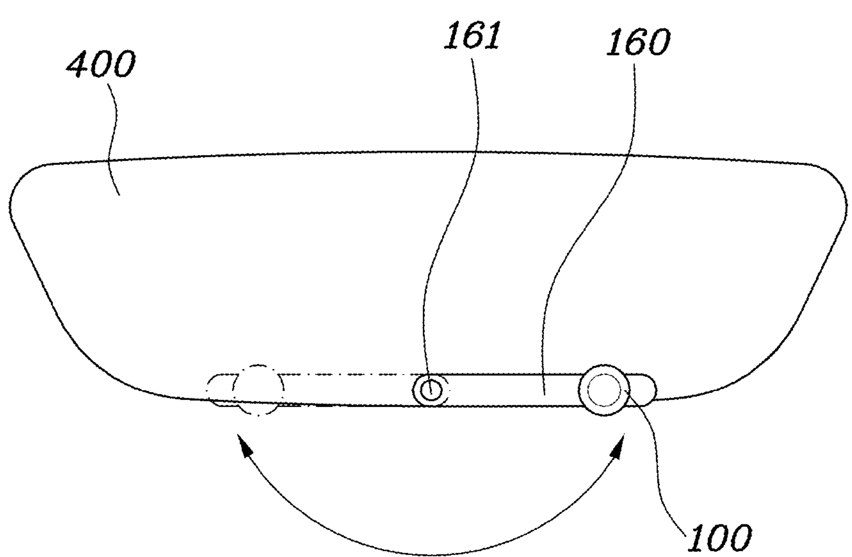
FIG. 6 is a view illustrating a configuration of a second embodiment in which a sensor part moves rotationally according to the present disclosure.
Figure 7:
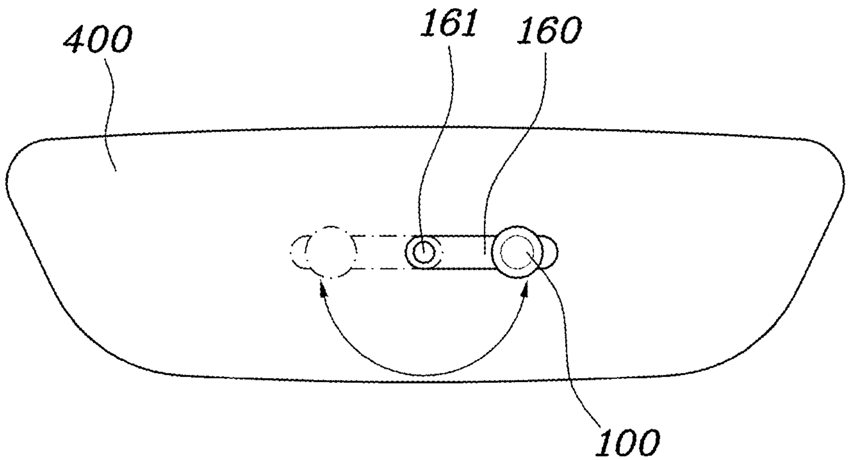
FIG. 7 is a view illustrating a configuration of a third embodiment in which a sensor part moves rotationally according to the present disclosure.

In other words, as shown in FIGS. 5-7, in a case where a sensor part 100 is installed in a rearview mirror 400, a center line of an angle of view of the sensor part 100 is directed toward an interior direction perpendicular to a plane of the rearview mirror 400.

Accordingly, as the sensor part 100 is moved along a predetermined rotation radius around the center line as an axis of the angle of view on the plane of the rearview mirror 400, a position of the sensor part 100 is moved. As a result, images that would have been captured by two or more sensor parts 100 may be secured through one sensor part 100.

Specifically, the sensor moving device includes: a driving part 110 for providing a driving force; a rotary shaft 161 mounted on an inner surface of a vehicle cabin; and a rotary part 160 provided with a sensor part 100 mounted on an end thereof. The rotary part 160 is coupled to the rotary shaft 161, and configured to move rotationally around the rotary shaft 161 along with the sensor part 100 by the driving force transmitted to the rotary shaft 161.

Referencing FIGS. 5-7, the rotary shaft 161 is mounted on the rearview mirror 400, and the bar-shaped rotary part 160 is coupled to a front end of the rotary shaft 161 so as to be rotatable together with the rotary shaft 161.

In addition, the driving part 110 may be a rotary actuator capable of rotating the rotary part 160. The rotary part 160 rotates around the rotary shaft 161 by a rotational driving force provided by the driving part 110. The driving part 110 may also rotate the rotary shaft 161 by utilizing a type of structure such as a rack and pinion type and a vane type, in addition to the rotary actuator type.

In particular, the sensor part 100 including a lens is coupled to an end of the rotary part 160, so that the sensor part 100 moves rotationally together with the rotation of the rotary part 160. As a result, a position of the sensor part 100 becomes changeable.

In this case, as shown in FIGS. 5 and 6, although rotating a small amount, the rotary part 160 is configured to be rotatable 360°, so that images from two or more points may be collected, thus increasing accuracy.

In addition, unlike FIG. 5 in which the rotary part 160 rotates 360°, the rotary part 160 as shown in FIG. 7 may be rotated only in some angular sections.

In such a structure, it may be configured such that the rotary part 160 and the sensor part 100 are hidden behind the rearview mirror 400 and then moved out of the rearview mirror 400 to rotate, or may also be configured such that only the sensor part 100 is exposed and then rotated. In addition, the rotary shaft 161 may be installed in the center of the rearview mirror 400, and may also be installed in an area other than the center.

According to such a configuration, coordinates of an object are calculated in a method of comparing frames taken before and after the movement of the sensor part 100 with each other. As a result, the method may be valuably used in passenger detection where a speed of processing coordinate calculation is not required to be high, and for tasks like 3D coordinate processing to detect passenger size and the like.

The present disclosure may be configured to further include a reflection part (e.g., reflector) 200 provided to reflect a shape of an object and allow the reflected shape of the object to be positioned within a range of an angle of view at which the sensor part 100 photographs the object. Additionally, the controller 300 may be configured to detect a position of the object by combining data of the object photographed by the sensor part 100 and data of the object reflected by the reflection part 200 and photographed by the sensor part 100.

The reflection part 200 may be a mirror. The mirror is based on a flat mirror, but depending on situations, a curved mirror may replace the above mirror or may be added to the above mirror, so that an additional angle of view is securable.

Figure 20:
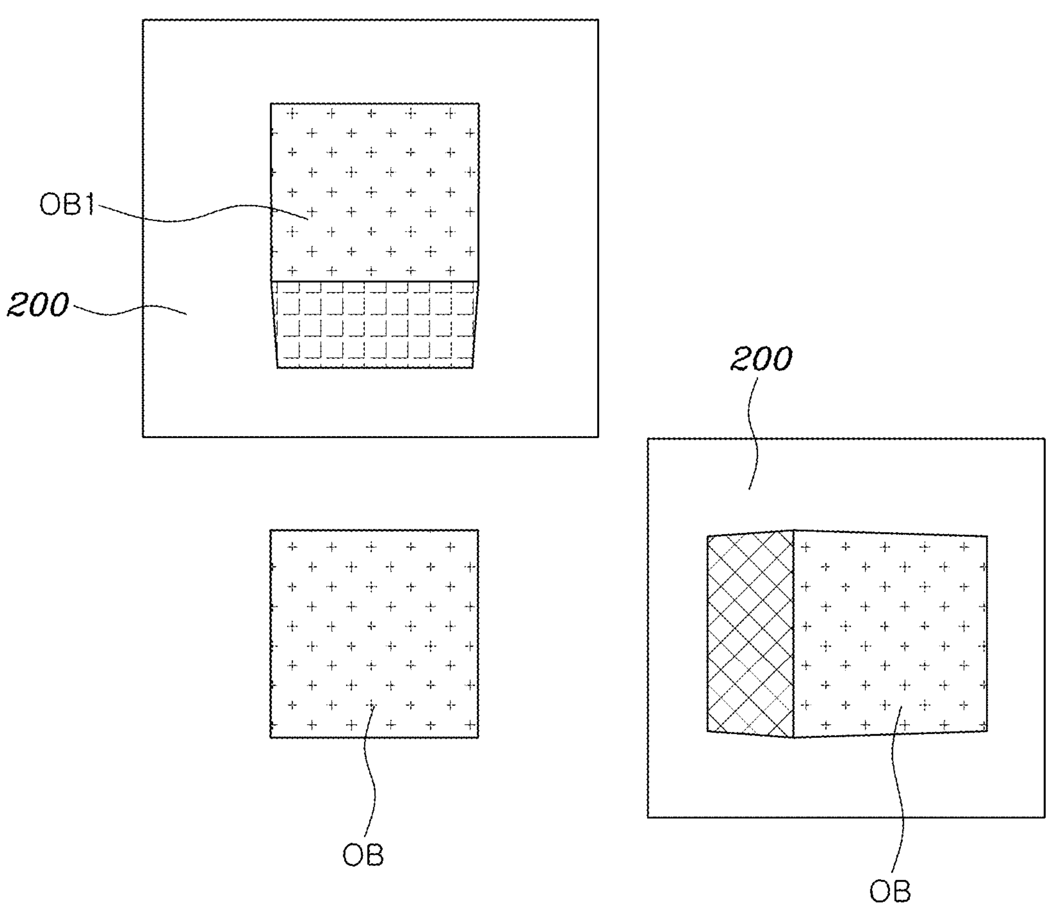
FIG. 20 is a view illustrating an image of an object photographed by a sensor part and an image of the object reflected by two reflection parts according to the present disclosure.

In other words, as shown in FIG. 20, by using images OB of one or more objects photographed by the sensor part 100 and images OB1 of one or more objects reflected on the reflection part 200, angles and distances between the sensor part 100 (i.e., a reference point) and the objects are calculated. Based on the calculated results, 3D coordinate positions of the corresponding objects are accurately detected.

In particular, when using the reflection part 200, since all objects are included in one image, 3D coordinate processing is enabled with just one image, thus a load on hardware may be reduced.

In another embodiment, the object detection device further includes a reflection part movement device 60 for moving a position of the reflection part 200. The controller 300 may detect a position of an object by combining data of the object photographed before movement of the reflection part 200 and data of the object photographed after the movement of the reflection part 200.

In other words, image data of the object reflected by the reflection part 200 and photographed before movement of the reflection part 200, and image data of the object reflected by the reflection part 200 and photographed after the movement of the reflection part 200 are stored and processed.

Accordingly, a position of the object is calculated by using image data of one or more objects photographed by the sensor part 100 and image data of two or more objects reflected on the reflection part 200. As a result, 3D coordinate positions of the corresponding objects are more accurately detected, and the detection performance of the objects is greatly improved.

In addition, the reflection part moving device may move the reflection part 200 rectilinearly in a direction parallel to a reflective surface of the reflection part 200.

Figure 8:
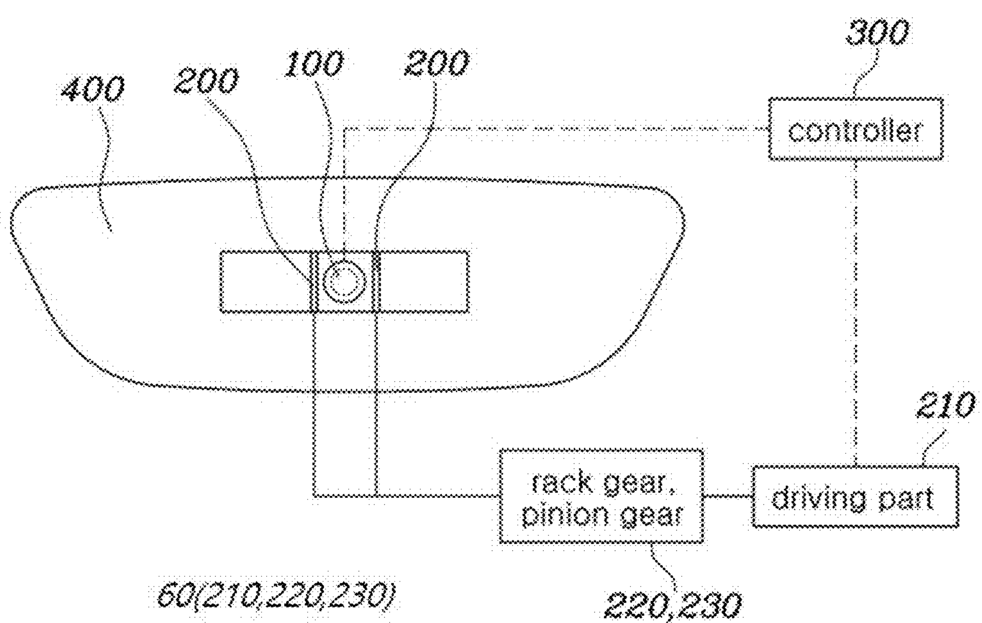
FIGS. 8 and 9 are views illustrating a configuration of an embodiment in which a reflection part moves rectilinearly according to the present disclosure.
Figure 9:
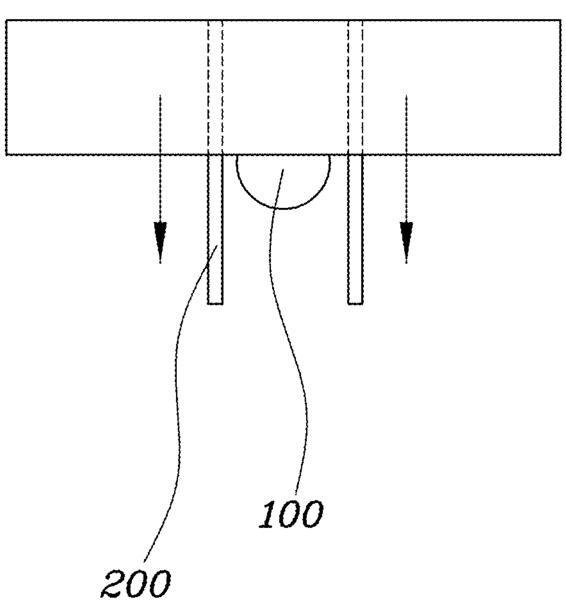

For example, in a case where a reflection part 200 is installed in a rearview mirror 400 and a reflective surface of the reflection part 200 is a flat plane, as shown in FIGS. 8 and 9, the reflective surface of the reflection part 200 is directed toward an interior direction perpendicular to the plane of the rearview mirror 400.

Accordingly, as the reflection part 200 is pulled out or pulled in and moved on the plane of the rearview mirror 400 in the interior direction perpendicular to the plane of the rearview mirror 400, a position of the reflection part 200 is moved. As a result, images that would have been captured by two or more sensor parts 100 may be secured through one reflection part 200.

In addition, the reflection part moving device may move the reflection part 200 rectilinearly in a direction in which the reflective surface of the reflection part 200 moves away from or to (i.e., approaches) the sensor part 100.

Figure 21:
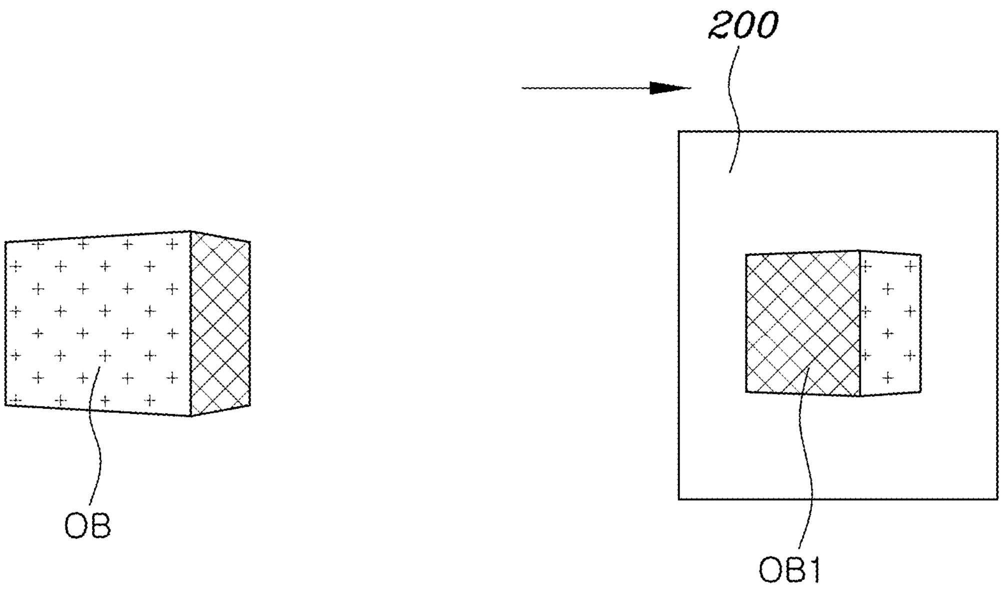
FIG. 21 is a view illustrating an image of an object reflected in a state where the reflection part of FIG. 19 is moved from the sensor part.

For example, in a case where a reflection part 200 is installed in a rearview mirror 400 as shown in FIG. 21, the reflection part 200 may be moved rectilinearly in a direction in which a reflective surface of the reflection part 200 moves away from the sensor part 100.

Accordingly, since the sensor part 100 may capture images of an object reflected on the reflection part 200 by moving a position of the reflection part 200, two or more images may be secured. This includes an image of the object directly photographed by the sensor part 100 through one reflection part 200 and an image of the object reflected on the reflection part 200.

As shown in FIGS. 8 and 9, the reflection part 200 may be configured to be movable rectilinearly through a reflection part moving device using a gear meshing method.

Specifically, the reflection part moving device includes: a driving part 210 for providing a driving force; a fixed gear mounted on an inner surface of a vehicle cabin and through which the driving force of the driving part 210 is transmitted; and a movable gear provided with a reflection part 200 mounted thereon. The movable gear is engaged with the fixed gear, and is moved rectilinearly together with the reflection part 200 by the driving force transmitted to the fixed gear.

The fixed gear and the movable gear may be a rack gear 220 and a pinion gear 230. The fixed gear may be the rack gear 220 or the pinion gear 230, and the movable gear may be the rack gear 220 or the pinion gear 230, so that the reflection part 200 may be mounted on the rack gear 220 or the pinion gear 230 depending on the embodiment.

For reference, the straight line movement method of the reflection part 200 as described above is substantially the same as the straight line movement method of the sensor part 100 shown in FIGS. 1 and 2, except that movement directions thereof are different from each other. The rack and pinion engagement structure applied to the movement of the reflection part 200 may be described with reference to the drawings shown in FIGS. 1 and 2.

Accordingly, in FIGS. 1 and 2, only the reference numerals "100," "110," "120," and 130" related to the sensor part moving device are expressed, but these reference numerals are described by respectively replacing them with reference numerals "200," "210," "220," and 230," which are related to the reflection part moving device.

FIG. 8 is a view schematically illustrating a configuration in which a reflection part 200 is mounted on a rack gear 220 or a pinion gear 230.

Accordingly, when describing a configuration in which a reflection part 200 is mounted on a rack gear 220 with reference to FIG. 1 together with FIG. 8, the rack gear 220 is installed on a rearview mirror 400 in front and rear directions, a pinion gear 230 is engaged with the rack gear 220, and a driving part 210 is connected to the pinion gear 230.

The driving part 210 may be a rotary motor capable of driving the pinion gear 230 to rotate, and the pinion gear 230 rotates around an axis thereof by a rotational driving force provided by the driving part 210.

In addition, as the rack gear 220 is engaged with the pinion gear 230, the rack gear 220 moves left and right rectilinearly by the rotation of the pinion gear 230.

In particular, the reflection part 200 is coupled to the rack gear 220 in front and rear directions of the rearview mirror 400, so that the reflection part 200 moves forward and backward rectilinearly along with the movement of the rack gear 220. As a result, a position of the reflection part 200 becomes changeable.

In addition, when describing a configuration in which the reflection part 200 is mounted on the pinion gear 230 with reference to FIGS. 2 and 8, the rack gear 220 is installed on the rearview mirror 400 in the front and rear directions, the pinion gear 230 is engaged with the rack gear 220, and the driving part 210 is connected to the pinion gear 230.

The driving part 210 may be a linear motor capable of driving the pinion gear 230 forward and backward rectilinearly. The pinion gear 230 is moved forward and backward rectilinearly by a driving force provided by the driving part 210.

In this case, as the pinion gear 230 is engaged with the rack gear 220, the pinion gear 230 moves forward and backward rectilinearly along a longitudinal direction of the rack gear 220.

In particular, as the reflection part 200 is coupled to the pinion gear 230, the reflection part 200 moves forward and backward rectilinearly along with the straight line movement of the pinion gear 230. As a result, a position of the sensor part 100 becomes changeable.

In such a configuration, the reflection part 200 may be coupled to the center of the pinion gear 230 and the reflection part 200 may be coupled to the pinion gear 230 through a bearing, and the like, so that the reflection part 200 is prevented from rotating together with the pinion gear 230.

Figure 10:
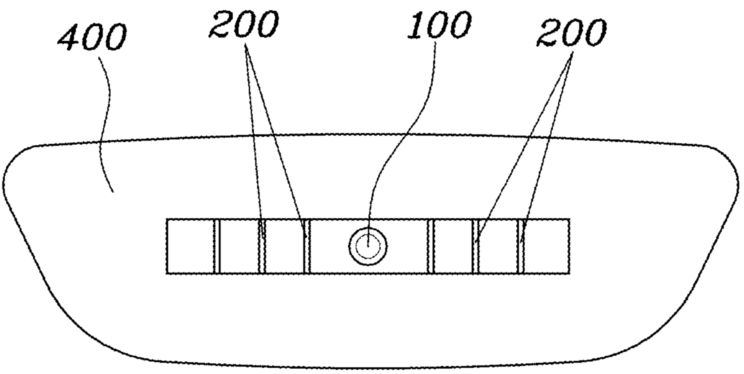
FIGS. 10 and 11 are views illustrating a configuration in which the number of reflection parts shown in FIG. 8 is increased.
Figure 11:
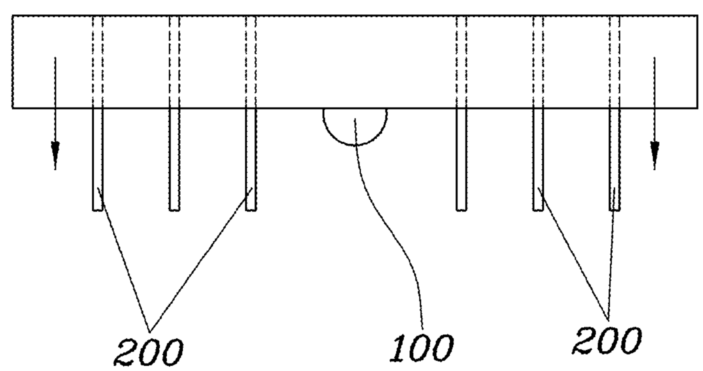

For reference, as shown in FIGS. 10 and 11, a structure may be configured such that multiple overlapping reflection parts 200 are arranged on the left and right sides of the sensor part 100. Each reflector (e.g., reflection part) 200 is capable of pulling-out and pulling-in operations and may be moved rectilinearly.

In addition, in the present disclosure, the reflection part 200 may be configured to be movable rectilinearly through a reflection part moving device having a sliding movement structure.

In one form, the reflection part moving device includes: a driving part 210 for providing a driving force; a guide part 240 having a bar shape and fixed to an inner surface of a vehicle cabin; and a slider 250 provided with a reflection part 200 mounted thereon. The slider 250 is inserted into the guide part 240, and is moved rectilinearly together with the reflection part 200 along a longitudinal direction of the guide part 240 by the driving force transmitted by the driving part 210.

For reference, the straight line movement method of the reflection part 200 as described above is substantially the same as the straight line movement method of the sensor part 100 shown in FIG. 3, except that movement directions thereof are different from each other. The sliding structure of the slider 250 applied to the movement of the reflection part 200 may be described with reference to the drawing shown in FIG. 3.

Accordingly, in FIG. 3, only the reference numerals "100," "110," "140," and "150" related to the sensor moving device are expressed, but these reference numerals are described by respectively replacing them with reference numerals "200," "210," "240," and "250," which are related to the reflection part moving device.

In other words, the guide part 240 having top and bottom portions thereof at which a plurality of bars is installed to be spaced apart from each other is installed in forward or backward directions on a rearview mirror 400. Additionally, in a state of being inserted into the guide part 240, the slider 250 may be moved forward or backward along the guide part 240.

The driving part 210 may be a linear motor capable of moving the slider 250 forward or backward rectilinearly. Additionally, the slider 250 moves forward or backward along the guide part 240 by a driving force provided by the driving part 210.

In particular, as the reflection part 200 is coupled to the slider 250, the reflection part 200 is moved forward and backward rectilinearly along with the movement of the slider 250. As a result, a position of the reflection part 200 becomes changeable.

Figure 19:
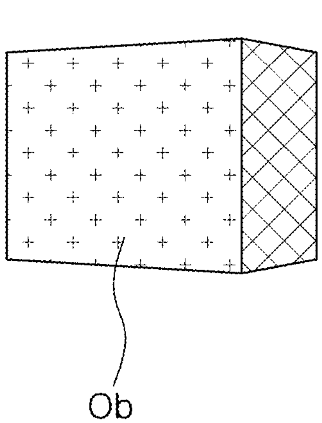
FIG. 19 is a view illustrating an image of an object photographed by a sensor part and an image of the object reflected by a reflection part according to the present disclosure.
Figure 19:
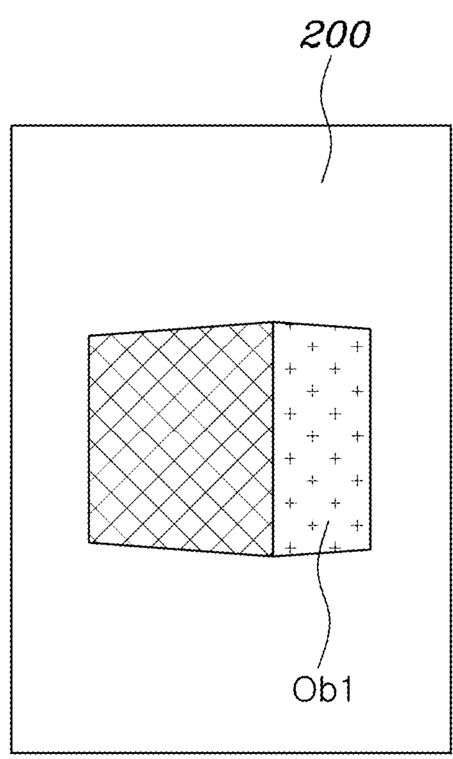

According to such a configuration, as shown in FIGS. 19 and 21, coordinates of an object are calculated in a method of comparing an image OB of the object captured before movement of the reflection part 200 and an image OB1 of the object captured after the movement of the reflection part 200. As a result, this method may be valuably used in passenger detection where a speed of processing coordinate calculation is not required to be high, 3D coordinate processing to detect passenger size is desired, and the like.

In one embodiment of the present disclosure, the reflection part moving device may rotate a second end of the reflection part 200 around a first end of the reflection part 200.

Figure 12:
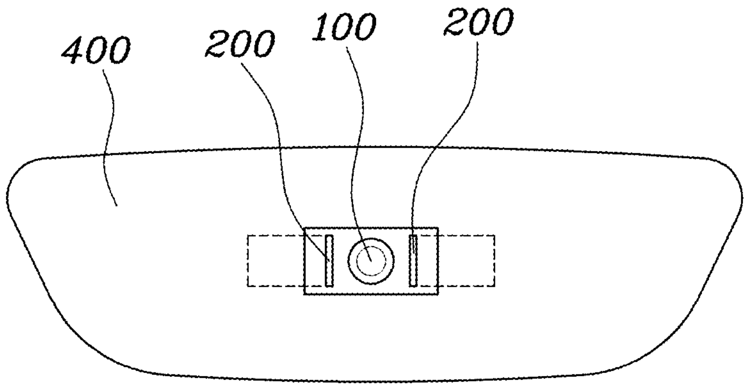
FIGS. 12 and 13 are views illustrating a configuration of an embodiment in which a reflection part moves rotationally according to the present disclosure.
Figure 13:
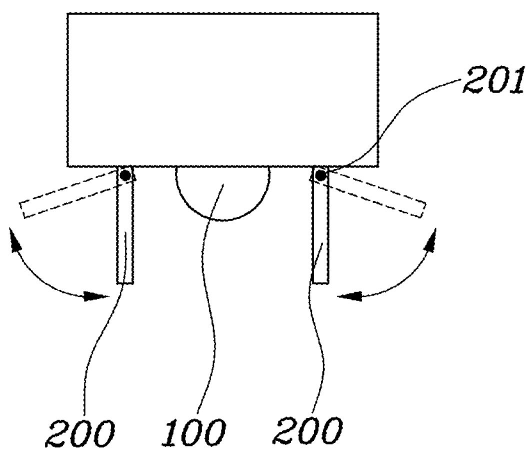

In other words, as shown in FIGS. 12 and 13, in a case where a reflection part 200 is installed on a rearview mirror 400, the reflection part 200 is rotated along a predetermined rotation radius on the plane of the rearview mirror 400, so that a position of the reflection part 200 is changed. As a result, images that would have been captured by two or more sensor parts 100 may be secured through one reflection part 200.

In one embodiment, the reflection part moving device includes: a driving part 210 for providing a driving force; and a rotary shaft 201 mounted on an inner surface of a vehicle cabin and through which the driving force of the driving part 210 is transmitted. The reflection part moving device is also configured to include a reflection part 200 having a first end thereof coupled to the rotary shaft 201 and a second end thereof moved rotationally around the rotary shaft 201 by the driving force transmitted to the rotary shaft 201.

Referring to FIGS. 12 and 13, a sensor part 100 is installed in the rearview mirror 400 and the rotary shaft 201 is mounted adjacent to the sensor part 100 in a vertical direction of the rearview mirror 400.

The first end of the reflection part 200 is coupled to the rotary shaft 201, so that the second end of the reflection part 200 is rotatable around the rotary shaft 201.

In addition, the driving part 210 may be a rotary actuator capable of rotating the rotary shaft 201. Accordingly, the reflection part 200 rotates around the rotary shaft 201 by a rotational driving force provided by the driving part 210. The driving part 210 may also rotate the rotary shaft 201 by utilizing a type of structure such as a rack and pinion type and a vane type, in addition to the rotary actuator type.

Accordingly, as the reflection part 200 moves rotationally, an image of an object reflected by the reflection part 200 is changed.

Figure 14:
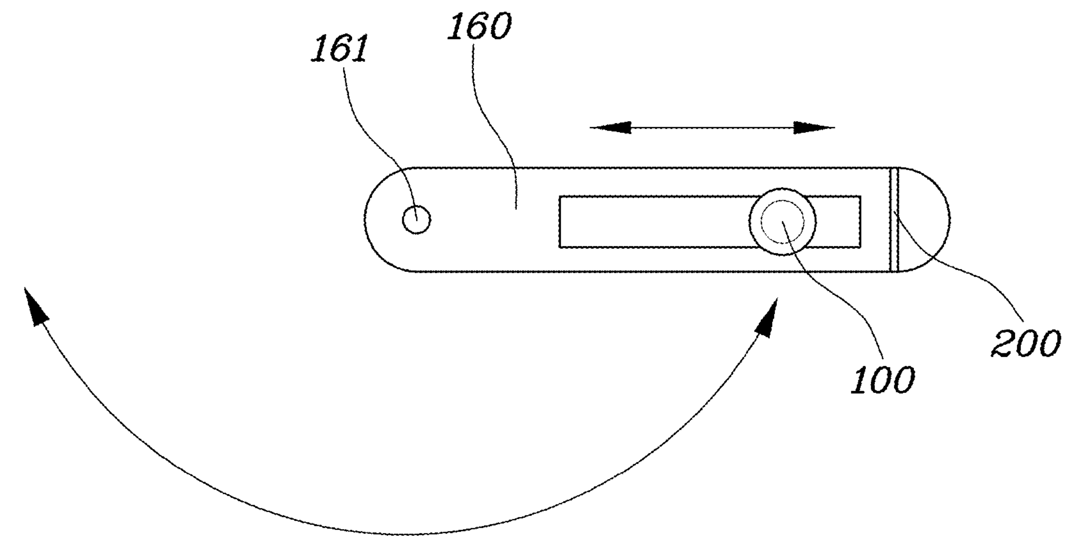
FIG. 14 is a view illustrating a structure in which a sensor part is installed to be movable rectilinearly and rotationally according to the present disclosure.

In addition, as shown in FIG. 14, the sensor part 100 may be configured to move in a straight direction. Furthermore, the sensor part 100 and the reflection part 200 may be configured in a complex form so as to move rotationally around the rotary shaft 161.

Figure 15:
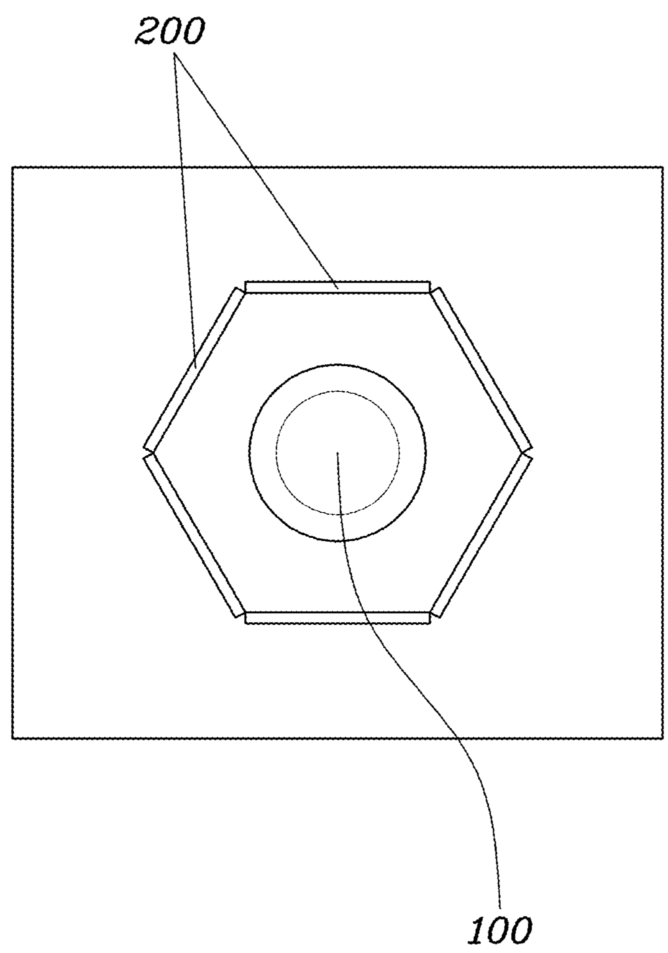
FIG. 15 is a view illustrating a structure in which a reflection part is installed in a shape surrounding a sensor part according to the present disclosure.

In addition, as shown in FIG. 15, a plurality of reflection parts 200 may be arranged in a shape surrounding the sensor part 100. The sensor part 100 and/or the reflection part 200 may also be configured to be movable in a straight direction.

Figure 16:
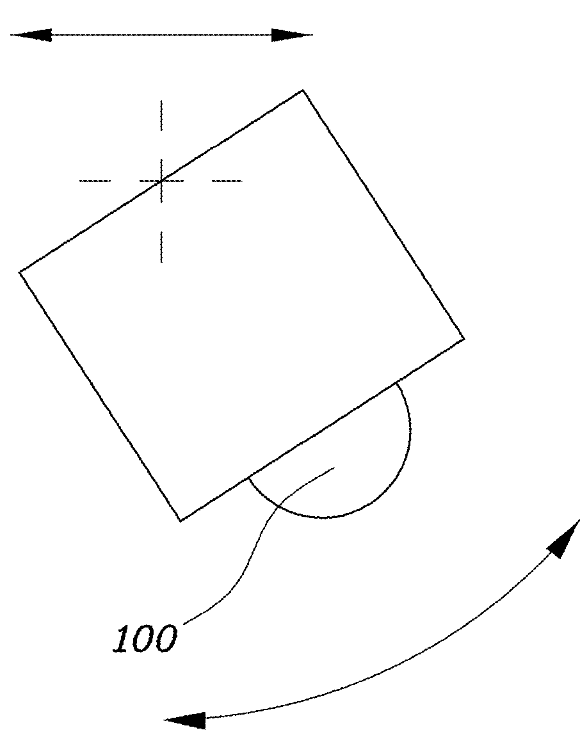
FIG. 16 is a view illustrating a structure in which a sensor part rotates according to the present disclosure.

In addition, as shown in FIG. 16, the sensor part 100 may be rotated so that an angle of view of the sensor part 100 is directed toward a specific direction. The sensor part 100 may also be configured to move rectilinearly while being rotated.

Although the present disclosure has been described in detail with respect to the above-described specific embodiments, it should be apparent to those having ordinary skill in the art that various changes and modifications are possible within the scope of the technical spirit of the present disclosure. Additionally, it is natural that such variations and modifications belong to the appended claims.

What is claimed is:

1. An object detection device, comprising:

a sensor part configured to generate image data of an object existing inside a vehicle cabin;

a sensor moving device configured to move a position of the sensor part between at least a first position and a second position; and a controller configured to determine a position of the object based on first image data generated at the first position and second image data generated at the second position.

2. The object detection device of claim 1, wherein the sensor moving device is configured to move the sensor part rectilinearly in a direction perpendicular to a center line of an angle of view relative to the center line of the angle of view at which the sensor part photographs the object.

3. The object detection device of claim 1, wherein the sensor moving device is configured to move the sensor part rectilinearly in an axial direction same as a center line of an angle of view at which the sensor part photographs the object.

4. The object detection device of claim 1, wherein the sensor moving device comprises:

a driving part configured to provide a driving force;

a fixed gear mounted on an inner surface of the vehicle cabin, wherein the driving force of the driving part is transmitted via the fixed gear; and a movable gear provided with the sensor part mounted thereon, wherein the movable gear is engaged with the fixed gear and moved rectilinearly together with the sensor part by the driving force transmitted to the fixed gear.

5. The object detection device of claim 4, wherein the fixed gear and the movable gear are a rack gear and a pinion gear.

6. The object detection device of claim 1, wherein the sensor moving device comprises:

a driving part configured to provide a driving force;

a guide part fixed to an inner surface of the vehicle cabin, wherein the guide part is formed in a bar shape; and a slider provided with the sensor part mounted thereon, wherein the slider is inserted into the guide part and moved rectilinearly together with the sensor part along a longitudinal direction of the guide part by the driving force transmitted by the driving part.

7. The object detection device of claim 1, wherein the sensor moving device is configured to rotate the sensor part along a predetermined radius on a plane perpendicular to a center line of an angle of view relative to the center line of the angle of view at which the sensor part photographs the object.

8. The object detection device of claim 1, wherein the sensor moving device comprises:

a driving part configured to provide a driving force;

a rotary shaft mounted on an inner surface of the vehicle cabin; and a rotary part provided with the sensor part mounted on an end thereof, wherein the rotary part is coupled to the rotary shaft and moved rotationally around the rotary shaft together with the sensor part by the driving force transmitted to the rotary shaft.

9. An object detection device comprising:

a sensor part configured to generate image data;

a reflection part configured to reflect an image of an object toward the sensor part; and a controller configured to determine a position of the object based on image data of the object directly captured by the sensor part and image data of the object reflected by the reflection part.

10. An object detection device comprising:

a sensor part configured to generate image data of an object;

a reflection part configured to reflect an image of the object toward the sensor part;

a reflection part moving device configured to move a position of the reflection part between at least a first position and a second position; and a controller configured to determine a position of the object based on first image data generated when the reflection part is at the first position and second image data generated when the reflection part is at the second position.

11. The object detection device of claim 10, wherein the reflection part moving device is configured to move the reflection part rectilinearly in a direction parallel to a reflective surface of the reflection part.

12. The object detection device of claim 10, wherein the reflection part moving device is configured to move the reflection part rectilinearly in a direction in which a reflective surface of the reflection part moves away from or to the sensor part.

13. The object detection device of claim 10, wherein the reflection part moving device comprises:

a driving part configured to provide a driving force;

a fixed gear mounted on an inner surface of a vehicle cabin, wherein the driving force of the driving part is transmitted via the fixed gear; and a movable gear provided with the reflection part mounted thereon, wherein the movable gear is engaged with the fixed gear and moved rectilinearly together with the reflection part by the driving force transmitted to the fixed gear.

14. The object detection device of claim 13, wherein the fixed gear and the movable gear are a rack gear and a pinion gear.

15. The object detection device of claim 10, wherein the reflection part moving device comprises:

a driving part configured to provide a driving force;

a guide part fixed to an inner surface of a vehicle cabin, wherein the guide part is formed in a bar shape; and a slider provided with the reflection part mounted thereon, wherein the slider is inserted into the guide part and moved rectilinearly together with the reflection part along a longitudinal direction of the guide part by the driving force transmitted by the driving part.

16. The object detection device of claim 10, wherein the reflection part moving device is configured to move a second end of the reflection part rotationally around a first end of the reflection part.

17. The object detection device of claim 10, wherein the reflection part moving device comprises:

a driving part configured to provide a driving force;

a rotary shaft mounted on an inner surface of a vehicle cabin, wherein the driving force of the driving part is transmitted via the rotary shaft; and the reflection part including:

a first end coupled to the rotary shaft, and a second end configured to be moved rotationally around the rotary shaft by the driving force transmitted to the rotary shaft.

* * * * *